United States Patent [19]
Rhyne et al.

[11] Patent Number: 5,637,162
[45] Date of Patent: Jun. 10, 1997

[54] TIRE STRUCTURE FOR IMPROVED TREAD LIFE

[75] Inventors: Timothy B. Rhyne, Greenville; Daniel G. Osborne, Greer, both of S.C.

[73] Assignee: Michelin Recherche et Technique S.A., Granges-Paccot, Switzerland

[21] Appl. No.: 622,900

[22] Filed: Mar. 29, 1996

Related U.S. Application Data

[63] Continuation-in-part of Ser. No. 242,685, May 13, 1994, abandoned, which is a continuation of Ser. No. 762,907, Sep. 19, 1991, abandoned.

[51] Int. Cl.$^6$ .................. B60C 3/00; B60C 9/08; B60C 9/20; B60C 11/00
[52] U.S. Cl. ............ 152/454; 152/209 R; 152/209 WT; 152/526; 152/538; 152/548
[58] Field of Search ................... 152/454, 548, 152/526, 538, 209 R, 209 WT

[56] References Cited

U.S. PATENT DOCUMENTS

| | | |
|---|---|---|
| 4,269,646 | 5/1981 | Miller et al. . |
| 4,343,341 | 8/1982 | Jackson .................. 152/454 |
| 4,387,758 | 6/1983 | Matsuda et al. .................. 152/454 |
| 4,513,802 | 4/1985 | Togashi et al. . |
| 4,564,055 | 1/1986 | Ghilardi . |
| 4,669,519 | 6/1987 | Togashi et al. . |
| 4,785,861 | 11/1988 | Fujiwara .................. 152/454 X |
| 4,915,151 | 4/1990 | Sato et al. . |
| 4,955,416 | 9/1990 | Takeuchi et al. .................. 152/454 |

FOREIGN PATENT DOCUMENTS

| | | | |
|---|---|---|---|
| 0402303 | 12/1990 | European Pat. Off. ........... 152/454 |
| 0424155 | 4/1991 | European Pat. Off. . |
| 2647716 | 12/1990 | France . |
| 2026956 | 2/1980 | United Kingdom .......... 152/454 |

*Primary Examiner*—Adrienne C. Johnstone
*Attorney, Agent, or Firm*—Robert R. Reed; Russell W. Warnock

[57] ABSTRACT

A radial pneumatic tire comprises a pair of axially spaced apart beads. A radially reinforced carcass extends between and is secured at opposite end portions to the beads. The carcass includes a plurality of parallel extending reinforcing members. Each of the reinforcing members is disposed in a radial plane. A tread is located radially outward of a crown portion of the carcass. The tread is for engagement with a ground surface. A belt reinforcement package is disposed between the carcass and the tread. The carcass and belt package have particular profiles when the tire is properly inflated.

7 Claims, 7 Drawing Sheets

TIRE STRUCTURE FOR IMPROVED TREAD LIFE

This application is a continuation-in-part application Ser. No. 08/242,685 filed on May 13, 1994, now abandoned which is a continuation of application Ser. No. 07/762,907 filed Sep. 19, 1991, now abandoned.

BACKGROUND OF THE INVENTION

1. Technical Field

The present invention relates generally to a pneumatic radial tire. In particular, the present invention relates to improvements to the carcass and belt package of the tire.

2. Description of the Prior Art

The tire industry is continually seeking increases in service life of a tire. Significant improvements were made in service life with the introduction of the radial pneumatic tire. Lesser improvements have periodically been made in the service life of the tire since the introduction of the radial tire. An example of a prior art radial pneumatic tire is illustrated in FIG. 1. The tire typically includes a pair of axially spaced apart beads B. A carcass C extends between the beads and is secured at axially opposite end portions to a respective one of the beads. The carcass includes substantially parallel extending reinforcing members of a suitable material. Each of the reinforcing members is disposed in a substantially radial plane. A belt package BP is located radially outward of a crown portion of the carcass. A tread T is located radially outward of the belt package for engaging a ground surface.

The industry standard tire is typically controlled or specified by an Association in each country, which defines the size and load range for passenger car tires. In the U.S., the Tire and Rim Association has such a specification. A typical specification (FIG. 2) defines the outside diameter and the cross sectional width for each tire size, with a window to show the variations allowed in the industry. Prior art tires are typically in a range of values close to the center of this window. The average tire of this invention is at a relatively small value of the outside diameter and at a relatively large value at the cross sectional width.

An agency of the United States Government has promoted consumer awareness and interest in increased service life through Uniform Tire Quality Grading Standards which were recently introduced. Such standards require the tire manufacturers indicate a tread life index on the sidewall of each tire produced.

As a part of the total improvement in tire service life, the tire designer has a number of options. These options include changing the tread compound, tread designs, carcass profile, bead, belt package, and reinforcing member materials. However, such improvements in service life often lead to tradeoffs in other tire performance characteristics. It is generally believed by those skilled in the tire art that the ability to keep the "contact patch", or "footprint", of the tire in engagement with the ground surface without scrubbing of the tread elements is desirable. Scrubbing is defined as the relative motion or movement between the tread surface and the ground surface at the interface between the tire and the ground. Scrubbing can occur at any point in the contact patch, but is more likely to occur at the entrance and exit of contact or at the lateral edge of the contact. For example, when the radial tire was introduced, a decrease in scrubbing when compared to a then existing bias tire, was realized. This decrease in scrubbing was a result of a relatively flexible sidewall which allowed a vehicle on which the tire was mounted to move laterally while maintaining relatively good contact with the ground surface. Another feature leading to improved service life was the relative increased size of the contact patch generally resulting in improved contact stress distribution and decreased average stresses at the tire-to-surface interface. An attempt to decrease rolling resistance in a pneumatic radial tire is disclosed in U.S. Pat. No. 4,513,802. U.S. Pat. No. 4,513,802 discloses a radial tire having a modified sidewall configuration. The curvature of the sidewall was modified by moving the maximum width position to a radial position closer to the tread of the tire.

A heavy truck tire is disclosed in U.S. Pat. No. 4,915,151. U.S. Pat. No. 4,915,151 discloses three relationships for controlling, optimizing, or minimizing the growth of the carcass sidewall due to inflation. One relationship is for a point near the bead area. Another relationship is for the maximum tread width area. Yet another relationship is for the shoulder area.

SUMMARY OF THE INVENTION

The present invention is directed to improvements to the structure of a tire. These improvements are directed to an optimum overall profiles of the belt package and the carcass of the tire. The improvements enable optimizing the contact patch of a loaded tire. These improvements are accomplished while maintaining other performance parameters at a relatively high level.

A radial pneumatic tire comprises a pair of axially spaced apart beads. A radially reinforced carcass extends between and is secured at opposite end portions to the beads. The carcass includes a plurality of parallel extending reinforcing members. Each of the reinforcing members is disposed in a radial plane. A tread is located radially outward of a crown portion of the carcass. The tread is for engagement with a ground surface. A belt package is disposed between the carcass and the tread.

Means for receiving a rim is included to locate the beads. The carcass has a profile taken in a radial plane when the tire is properly inflated. The profile is defined by a central portion having a first radius of curvature taken at the intersection of one of the carcass reinforcing members and a mid-circumferential plane of the tire. The first radius of curvature is at least three times the carcass radius when the tire is properly inflated. The first radius of curvature extends 2 degrees to either side of the mid-circumferential plane.

A first point defined by an axial distance from the mid-circumferential plane in a range of about 25 percent to about 32 percent of the carcass radius and a first radial distance measured radially inwardly from the intersection of one of the carcass reinforcing members and the mid-circumferential plane in the range of about 3 percent to about 5 percent of the carcass radius. A second point defined between the first point and an end point of the arc created by the first radius of curvature. The second point defined from the location 65 percent of a linear distance from the first point to the end point by constructing a normal to the linear distance. The normal intersects a second radial line measured inwardly from the intersection of one of the carcass reinforcing members and the mid-circumferential plane a distance of about 1.6 to 3.2 millimeters. The intersection defining the second point. A second radius of curvature is in the range of about 17 percent to about 30 percent of the carcass radius. Whereby the second radius measured to both the first point and the second point defines a point of origin of the second radius of curvature. A blend portion has a third radius of curvature between the second point and the end point created by the first radius of curvature through its arc. The blend portion has a third radius of curvature defined by a distance where the line from the second point through the origin point intersects a line extending between the origin of the radius of curvature and the end point of the arc created by the first radius of curvature. The third radius of curvature is in the range of about 13 percent to about 145 percent of the crown radius. A sidewall portion extends from the first point to a rim transition point in a direction radially inward and has a fourth radius of curvature. The ratio of the fourth radius of curvature times the radius to a sidewall point divided by the radius to the first point is in the range of 30 to 64 millimeters and in one embodiment in a range of 38 to 50 millimeters.

The tire also includes means for limiting shear strains at each lateral belt edge of the belt package during inflation of the tire from an uninflated condition to a predetermined pressure. This is done by limiting a first radial growth of the carcass at a mid-circumferential plane of the tire to a growth of about 0.3 millimeter to 0.5 millimeter. A second radial growth of the carcass at each lateral belt edge is limited to a growth less than the first radial growth. A third growth of the carcass sidewall in a direction transverse to the mid-circumferential plane is greater than the first radial growth. Preferably the second radial growth is 60 to 90 percent of the first radial growth. Preferably the third growth is 200 to 400 percent of the first radial growth.

The belt package includes a first belt located radially outwardly of the carcass and has a plurality of substantially parallel extending reinforcing members. The reinforcing members are disposed at a first angle relative to the mid-circumferential plane. The width of the first belt is 107 percent to 116 percent of the rolling tread width. A second belt is located radially outwardly of the first belt and has a plurality of substantially parallel extending reinforcing members disposed at a second angle in a direction opposite to the first angle. The width of the second belt is approximately 100 percent to 108 percent of the rolling tread contact width of the tread.

The profile of the tire is wider and flatter than the profile of the tire from prior art tires. The cross-sectional width of the tire is 1 to 10 percent greater than the section width of an industry standard tire. The outside diameter of the inflated tire is about 0.1 to 5 percent less than the outside diameter of an industry standard tire. The radius of curvature of the carcass within 2 degrees of the mid-circumferential plane is at least three times the radius of the carcass when the tire is properly inflated and taken in the mid-circumferential plane.

The radially outermost belt of the belt package has a predetermined radial droop. The radial droop is taken in a radial plane and is defined by the radial distance from the belt mid-thickness at the mid-circumferential plane to the mid-thickness at a lateral edge of an axial limit of the outermost belt.

BRIEF DESCRIPTION OF THE DRAWINGS

Further features of the present invention will become apparent to those skilled in the art to which the present invention relates from reading the specifications with reference to the accompanying drawings, in which.

DESCRIPTION OF PREFERRED EMBODIMENT

Figure 3:
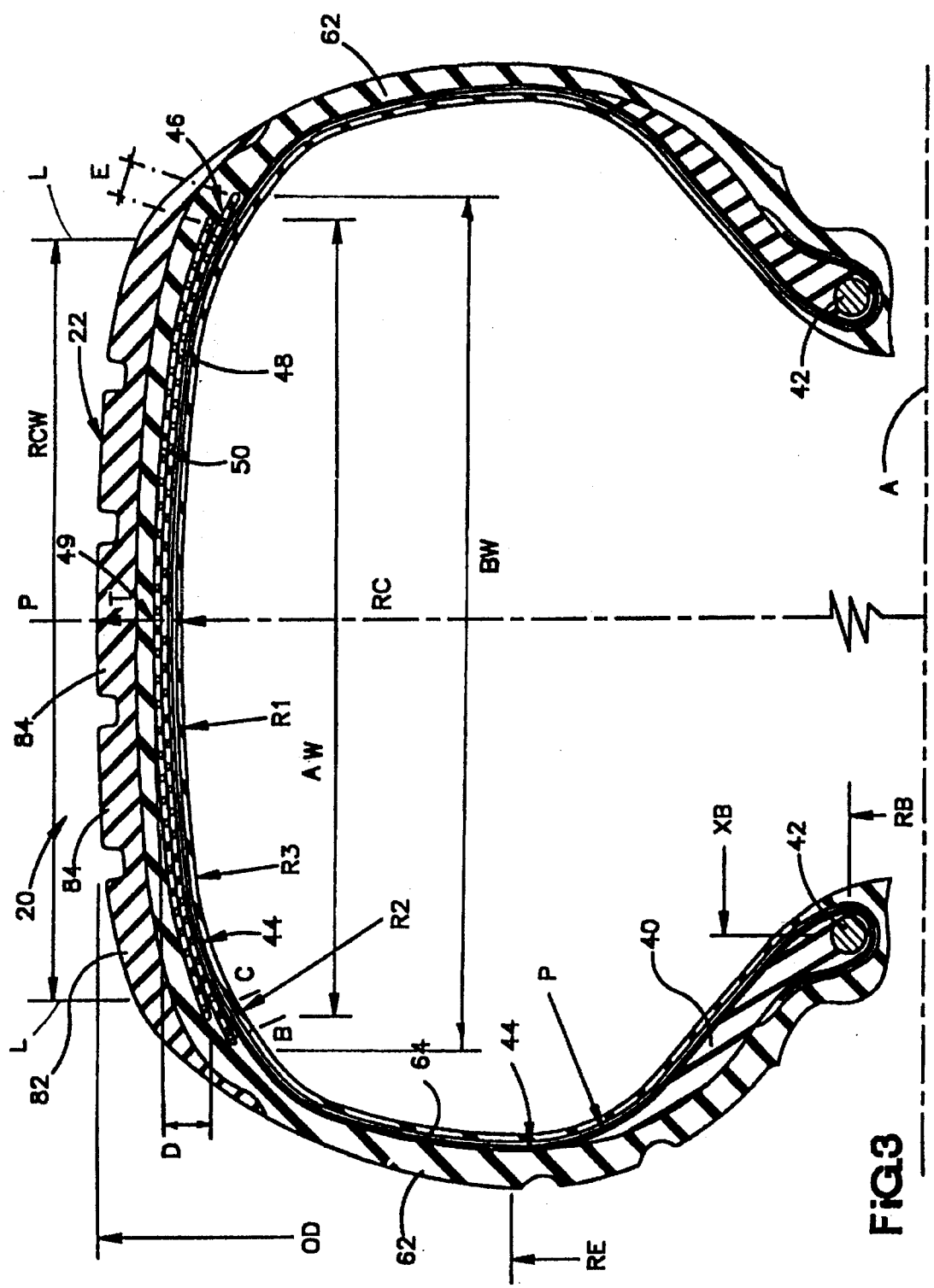
FIG. 3 is a cross-sectional view of a tire embodying the structure of the present invention.

A tire 20 (FIG. 3) has a tread 22 and a structure embodying the present invention. The tire 20 is of the all season type. The tire 20 is rotatable about a longitudinal central axis A (FIG. 3). The tire 20 is bisected by a mid-circumferential plane P extending perpendicular to the axis A. The tire 20 is adapted to be mounted on a rim (not shown) and properly inflated according to various parameters. The rim axially and radially locates beads 42 of the tire 20.

The tire 20 includes a pair of axially spaced apart and substantially circumferentially inextensible beads 42. An apex 40 extends radially outwardly from a respective bead 42. The tire 20 has a carcass ply 44 extending between and secured at respective axially opposite end portions to a respective bead 42. The carcass ply 44 has a plurality of parallel extending reinforcing members. The reinforcing members extend in a direction substantially parallel to a radial plane extending from the axis A.

The reinforcing members are made from any suitable material but are preferably polyester. The size and strength of the reinforcing members will change as a function of various tire parameters.

Figure 4:
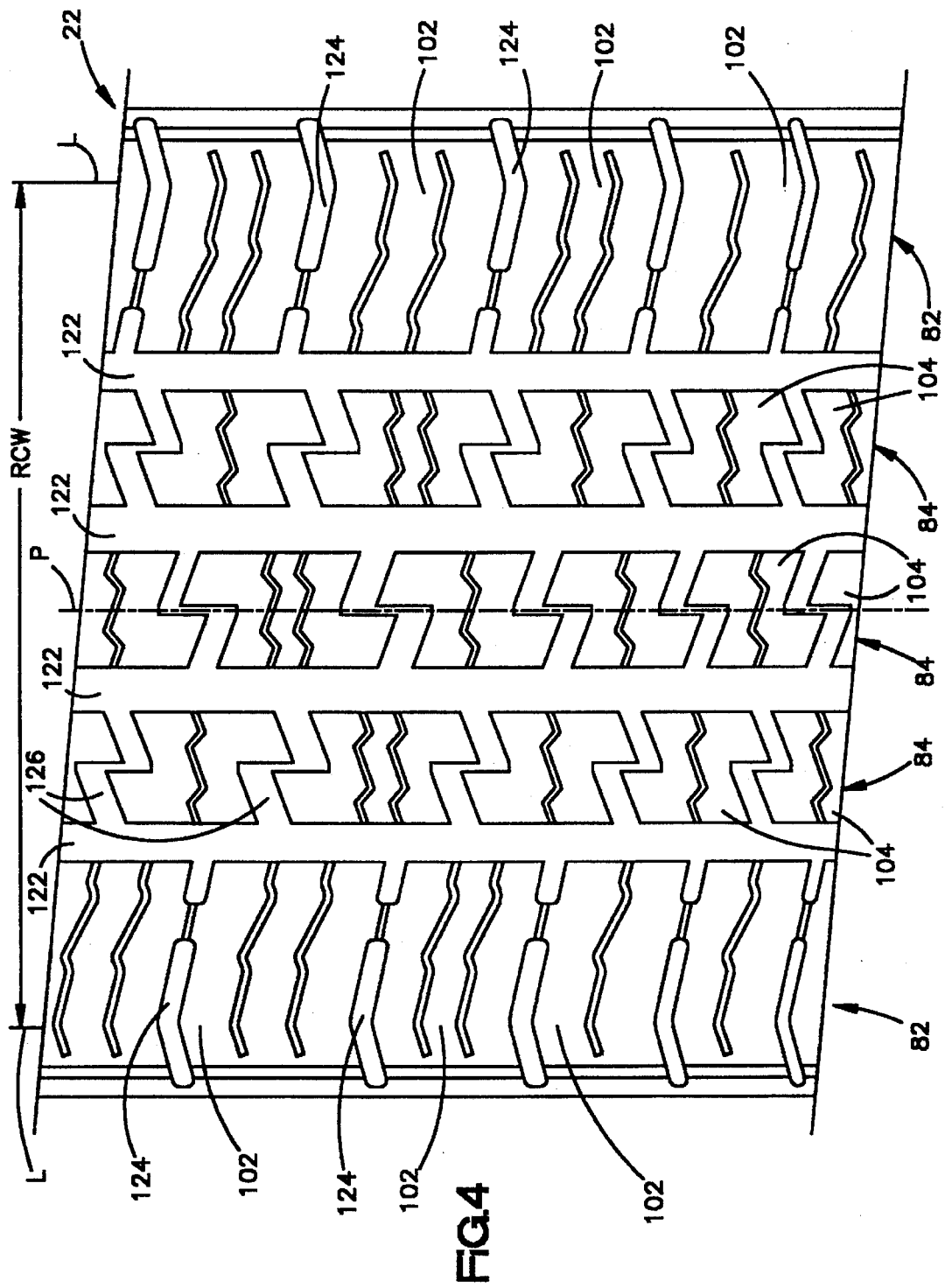
FIG. 4 is an enlarged plan view of a portion of the tread for the tire in FIG. 3.

The tread 22 of the tire 20 includes a pair of shoulder ribs 82 (FIG. 4) which are located at axially opposite end portions of the tire. The tread 22 also includes three intermediate ribs 84. However, it will be apparent that any number of intermediate ribs may be employed dependent upon the size, loading and other factors of the tire 20 and its desired application.

A belt package 46 is located radially outwardly of the carcass 44. A pair of annular steel belts 48,50 comprise the belt package 46. Rubber is located outwardly of the carcass ply 44 in the sidewalls 62 of the tire 20 (FIG. 3). Rubber is also located in the tread 22 at a location radially outwardly of the belts 46. The rubber in the sidewalls 62 and the tread 22 may be the same but is preferably different for different applications. Preferably the tread 22 includes rubber having a greater durometer hardness than the rubber in the sidewalls 62. The relatively harder rubber generally resists abrasion better. The rubber in the tread 22 and sidewalls 62 may be of any suitable compound based on natural or synthetic rubber or any suitable combination thereof. The tire 20 also includes a relatively air impermeable inner liner 64.

Each of the shoulder ribs 82 includes a plurality of tread elements 102 which are arranged in a circumferential array about the outer circumference of the tire 20. Each of the intermediate ribs 84 includes a plurality of tread elements 104 which are also arranged in a circumferential array about the outer periphery of the tire 20 at a different axial location than the tread elements 102. Each of the tread elements 102,104 engage a ground surface as the tire 20 rotates through a contact patch. Thus, all of the load transmitted between the carcass ply 44 and the ground surface is transmitted through the tread elements 102,104. The void ratio of the tread 22 is at least 0.25 for the service life of the tire and preferably at least 0.33. The void ratio is defined as the area of non-contact located between the axial limits L of the rolling tread contact width RCW divided by the total area between the axial limits of the rolling tread width.

Each rib 82,84 is axially separated from an axially adjacent rib by a relatively wide and continuous circumferential groove 122. Each tread element 102 located in a respective shoulder rib 82 is separated from a circumferentially adjacent shoulder tread element by a relatively wide and deep transverse by extending groove 124. Each tread element 104 in an respective intermediate rib 84 is separated from a circumferentially adjacent intermediate tread element by a transverse groove 126. The transverse grooves 124,126 define circumferential limits of a respective tread element 102,104. The transverse grooves 124,126 may be of any configuration when viewed in a direction normal to the surfaces defining the grooves, for example, straight, curved or, as illustrated, zigzagged. The radial depth of the circumferential grooves 122 and transverse grooves 124,126 is preferably relatively equal throughout the tread 22 of a distance about 19/32 inch. The tread 22 has axially limits L defining a rolling tread contact width RCW as the tire 20 rotates through a contact patch. The relatively wide and deep grooves 124 extending axially inward from the axial limits L defining the rolling tread contact width RCW enable the tire 20 having a tread according to the present invention to be labeled all season.

It will be noted the tread elements 104 and intermediate ribs 84 are circumferentially offset from axially adjacent tread elements 104 in the intermediate ribs 84 and from the tread elements 102 in the shoulder ribs 82. This results in a relatively quiet tire as the tire 20 rotates during operation on a vehicle.

Each tread element 104 in a respective intermediate rib 84 may be of any suitable configuration when viewed in a direction normal to the radially outer surface of the tread element. Each of the tread elements 104 have a substantially Z-shaped appearance. Each tread element 102 has a substantially rectangular configuration located within the axial limit L of the rolling tread contact width RCW.

It is the structure of the tire 20 which uniquely defines the tire embodying the present invention from the tires previously known. Specifically, the profile of the carcass 44 and the configuration of the belt package 46 differentiate the tire 20 from the heretofore known tires.

The carcass 44 has a profile, when viewed in a plane extending radially from the axis A, which is established during a curing process in a mold. The carcass 44 has a shape referred to as a stress equilibrium profile.

The belt package 46 is relatively wide when compared to those in the prior art. The belt package is also relatively flatter than a prior art tire. The relatively wide belt package 46 allows the tire 20 embodying structure of the present invention to have a relatively wide contact patch or footprint as the tire rotates. The relatively large contact patch allows the load of the tire to be distributed over a relatively larger surface area in contact with the ground surface. This results in lower normal stresses in the tread 22 of the tire 20. This provides several advantages in that less heat is built up permitting longer wear in the tread 22 of the tire.

The belt package 46 includes a first annular belt 48 which is located radially outward of the carcass 44. The first belt 48 has a axial width BW (FIG. 3) which is in the range of about 107 to 116 percent of the rolling tread contact width RCW. The first belt 48 has a plurality of substantially parallel extending reinforcing members therein. The reinforcing members are preferably steel wires or filaments. Each of the reinforcing members extend at an angle relative to the mid-circumferential plane in the range of about 20 to 24 degrees.

The belt package 46 also includes a second belt 50 located radially outwardly of the first belt 48. The second belt 50 has a second axial width AW which is approximately 100 percent to 108 percent of the axial width of the rolling tread, being contact width RCW. The tread contact width is defined by the axial limits L. Parallel reinforcing members in the second belt 50 are disposed at a second angle of about 20 to 24 degrees relative to the mid-circumferential plane, the second angle being in an opposite direction to a first angle of the first belt 48.

The profile of the carcass 44 according to the present invention combined with the configuration of the belt package 46 minimizes stresses at each lateral edge of the belt package 46 when the tire 20 is inflated from essentially an uninflated condition to a predetermined proper inflation pressure. The inflation pressure is determined by the size and load rating of the tire 20. The first radial growth at the mid-circumferential plane during inflation is limited preferably in the range of 0.3 mm to about 0.5 mm. The second radial growth at each lateral belt edge during the inflation process is less than the first radial growth. A third growth in the carcass at each sidewall taken transverse to the mid-circumferential plane during the inflation process is greater than the first radial growth. The second radial growth is preferably 60 to 90 percent of the first radial growth. The third growth is 200 to 400 percent of the first growth, and preferably 260 to 370 percent.

Thus, the maximum dynamic shear strains are limited at the lateral belt edges during contact with the ground surface in a manner such that the maximum shear strain is reduced by at least 20% when compared with the same dynamic shear strains of prior art tires constructed in a manner consistent with the Tire and Rim Association standard tire.

Figure 6:
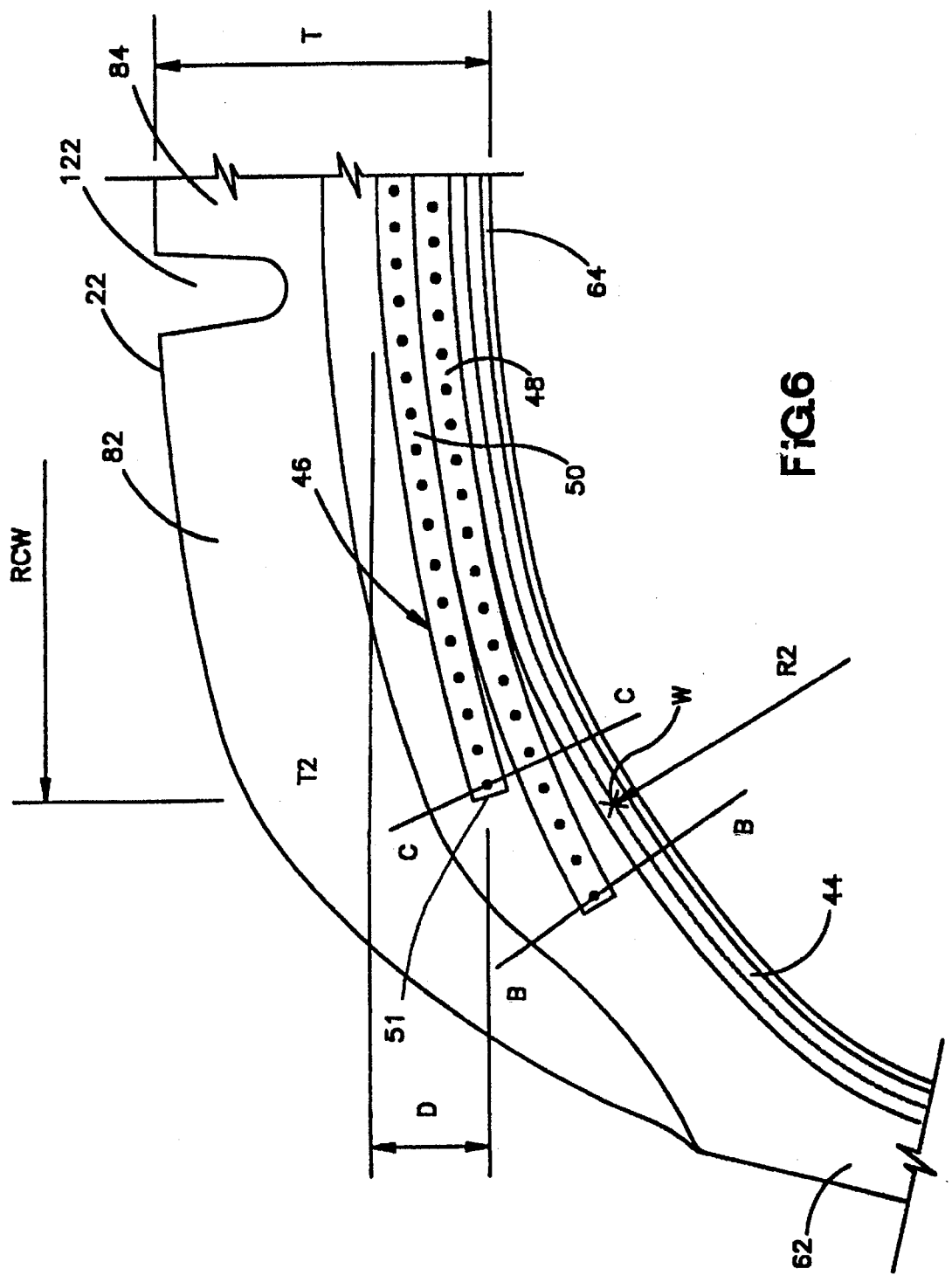
FIG. 6 is an enlarged cross-sectional view of a shoulder area of the tire in FIG. 3.
Figure 8A:
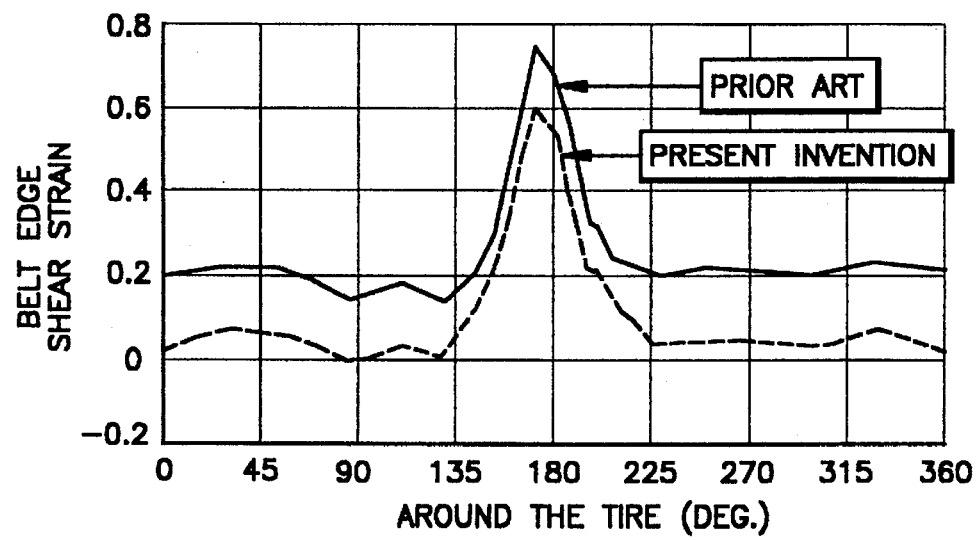
FIG. 8A is a graph of belt edge shear strain.
Figure 8B:
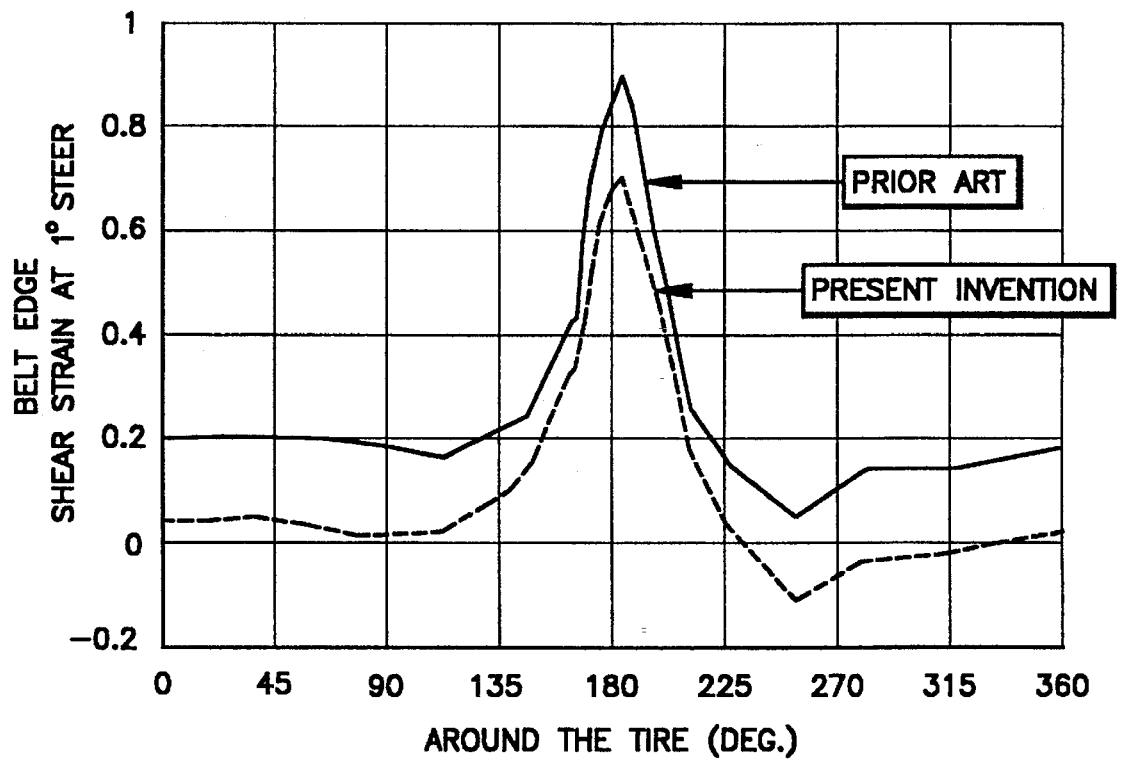
FIG. 8B is a graph of belt edge shear strain at a one degree of steer angle.

The second belt 50 or radially outward belt has radial droop D characteristic which defines a relatively flat profile when viewed in cross-section as illustrated in FIG. 6. For example, a range of passenger tires will have a radial droop D in the range of 6 millimeters to 10 millimeters. The radial droop is defined as the distance in a direction radially from a point (FIG. 3) at a mid-thickness of the second belt 50 at the mid-circumferential plane to a mid-thickness of the second belt at the belt edge 51 (FIG. 6). The profile of the tire is wider and flatter than the profile of the tire from prior art tires. The cross-sectional width of the tire is 1 to 10 percent greater than the section width of an industry standard tire. The outside diameter of the inflated tire is about 0.1 to 5 percent less than the outside diameter of an industry standard tire. The profile of the present invention is illustrated in the lower right hand corner of the Tire and Rim Association window. Prior art tires are defined as having a range of profiles as indicated. These dimensions are taken when the tire 20 is properly inflated.

The structure according to the present invention allows a tire which had a relatively uniform thickness of rubber in the tread 22 of the tire 20. The tread element of the tire 20 embodying the present invention have been analyzed to determine that they wear at a relatively even rate. This allows the tire 20 of the present invention to not have to beef up the shoulder ribs or shoulder tread elements which can be of any shape and configuration and number. Thus, the relatively thin and uniform thickness of rubber in the tread 22.

Figure 5:
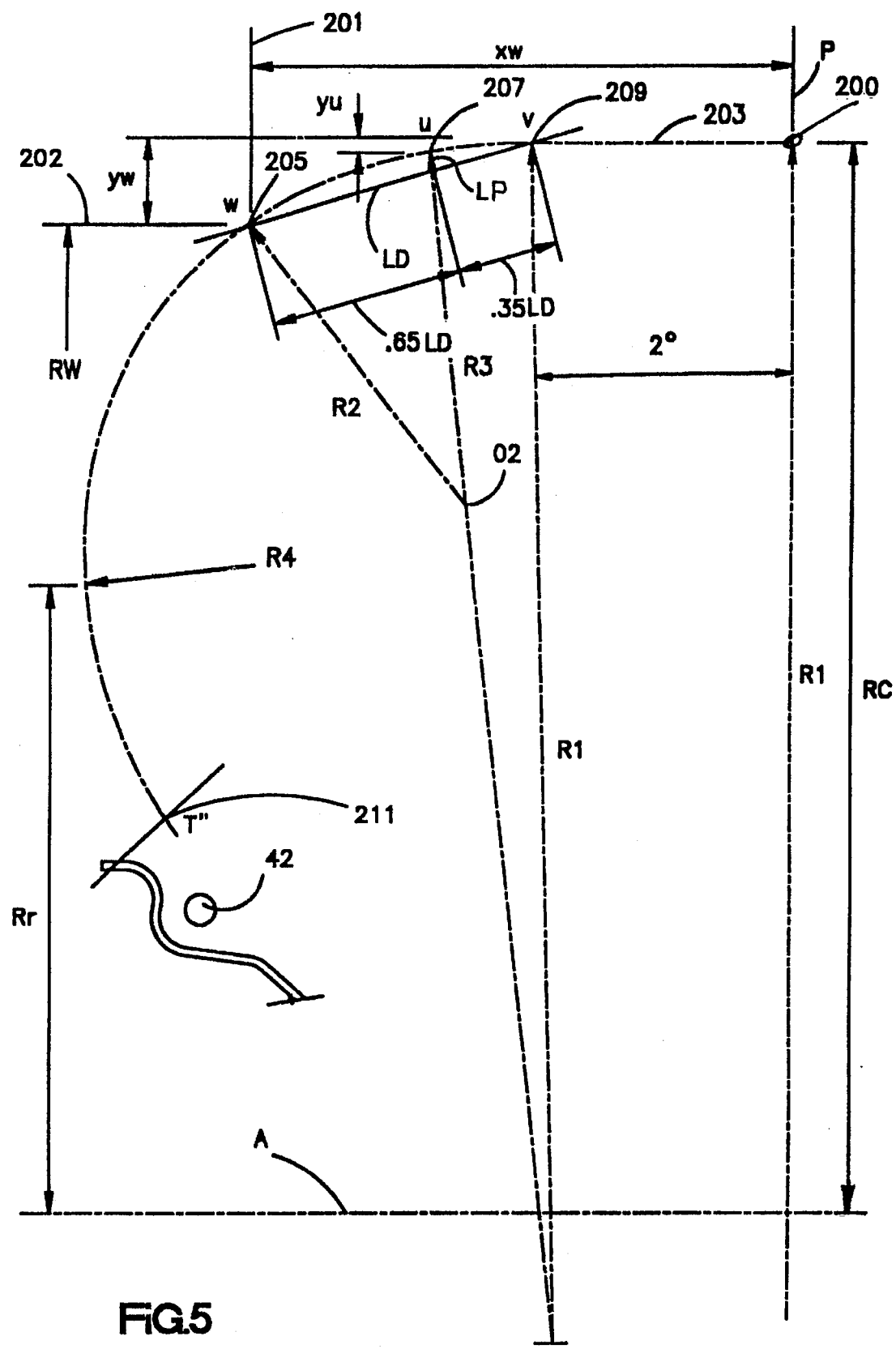
FIG. 5 is a detailed illustration of the carcass of the tire in FIG. 3.

The carcass has a profile taken in a radial plane when the tire is properly inflated (FIG. 5). The profile is defined by a central portion having a first radius of curvature R1 taken at the intersection of one of the carcass reinforcing members 203 and a mid-circumferential plane P of the tire 20.

The first radius of curvature R1 is at least three times the carcass radius RC when the tire is properly inflated. The first radius of curvature R1 extends 2 degrees to either side of the mid-circumferential plane P.

A first point 205 is defined by an axial distance XW from the mid-circumferential plane in a range of about 25 percent to about 32 percent of the carcass radius RC and a first radial distance YW measured radially inwardly from the intersection of one of the carcass reinforcing members 203 and the mid- circumferential plane P in the range of about 3 percent to about 5 percent of the carcass radius. A second point 207 is defined between the first point 205 and an end point 209 of the arc created by the first radius of curvature R1. The second point 207 is defined from the location 65 percent of a linear distance LD from the first point to the end point by constructing a normal to the linear distance LD. The normal intersects a second radial distance YU measured inwardly from the intersection of one of the carcass reinforcing members 203 and the mid-circumferential plane P a distance of about 1.6 to 3.2 millimeters. The inter-section defining the second point 207. A second radius of curvature R2 measured to both the first point 205 and the second point 207 is in the range of about 17 percent to about 30 percent of the carcass radius, whereby a point of origin 02 of the second radius of curvature R2 is defined. A blend portion has a third radius of curvature R3 between the second point 207 and the end point 209 created by the first radius of curvature R1 through its arc. The blend portion has a third radius of curvature R3 defined by a distance where the line from the second point 207 through the origin point 02 intersects a line extending between the origin of the first radius of curvature R1 and the end point 209 of the arc created by the first radius of curvature R1. The third radius of curvature R3 is in a range of about 13 percent to about 145 percent of the carcass radius RC. A sidewall portion extends from the first point 205 radially inward and has a fourth radius of curvature R4. The ratio of the fourth radius of curvature R4 times the radius RR to a sidewall point of the sidewall portion divided by the radius R to the first point is in the range of 30 to 64 millimeters. This ratio continues for the fourth radius of curvature R4 to an inward radial position where the carcass membrane tension is first influenced by the bending moments due to the presence of of the bead flange on the rim. This inward radial position is referred to as a rim transition point 211 as its location depends upon the rim flange geometry as well as the size of tire and its bead area. No particular fixed dimensions can be given for the location of the rim transition point 211 relative to the bead 42 of the rim flange for all tire and rim sizes. There is a smooth transition at the first point 205 where the fourth radius of curvature R4 and the second radius of curvature R2 are equal.

A tire 20 having a structure embodying the present invention has been tested and shown to have 30% of its starting radial tread depth D at the equivalent of 100,000 miles of service. The tire 20 also has been tested and found to have a UTQG rating in the range of 480 to 520, depending on the size of the tire 20. From the above description of the preferred embodiment of the invention, those skilled in the art will perceive improvements, changes and modifications. Such improvements, changes and modifications within the skill of the art are intended to be covered by the appended claims.

Experimental Evidence

During reduction to practice of the present invention a number of experimental tests were performed. During each test a prior art tire was compared with the present invention tire having the same size and overall load carrying capability. That is, two tires being compared with each other both fit the same industry Tire and Rim Association standard. A number of comparisons were made including 15", 14", and 13" standard tires.

A typical comparison is shown in comparative example 1. This comparison was made for a Michelin XH tire having a size of 205/75 R15. The values in this table have been normalized to an index value of 100 for the prior art tire. For example, the contact surface ratio of the prior art tire has a value of 0.667 and the present invention tire had a contact surface ratio of 0.661. Using a value of 100 for 0.667 the present invention tire has a value of 99. Other values of particular interest include the width of the contact area having an 8 percent increase for the present invention tire and the reduced normal stress on the present invention tire. Both the average normal stress per rib and the difference between the maximum and minimum stress have significant reductions when compared with the prior art tire. This is accomplished with only a one percent increase in the tire mass.

COMPARATIVE EXAMPLE 1

| Parameter Same Size Tire And Load | Prior Art | Present Invention |
|---|---|---|
| Contact Surface Ratio | 100 | 99 |
| Width of Contact Area | 100 | 108 |
| Length of Contact Area | 100 | 96 |
| Average Total Load Per Rib | 100 | 100 |
| Difference in Max. - Min. Load/Rib | 100 | 27 |
| Average Normal Stress Per Rib | 100 | 88 |
| Normal Stress Max. - Min. Difference | 100 | 68 |
| Tire Mass | 100 | 101 |

The performance of the present invention tire during cornering maneuvers of the vehicle were also simulated. For this simulation both the prior art tire and the present invention tire were tested at a one degree steer angle. The resulting longitudinal, lateral, and normal stress for this same 205/75 R15 tire are shown in comparative example 2. This table is also normalized at a value of 100 for the prior art tire. Of particular interest is the lateral stress average which is significantly greater for the present invention tire. This results in a greater cornering power for the tire of the present invention. Lower longitudinal stress and stress differences as well as normal stresses and differences in stress are obvious for the present invention. The results as a whole indicate a much improved stress distribution than that of the prior art tire.

COMPARATIVE EXAMPLE 2

| Parameter @ one degree steer angle | Prior Art | Present Invention |
|---|---|---|
| Longitudinal X-Stress Average | 100 | 82 |
| X-Stress Max. - Min. Difference | 100 | 65 |
| Lateral Y-Stress Average | 100 | 111 |
| Y-Stress Max. - Min. Difference | 100 | 59 |
| Normal Z-Stress Average | 100 | 92 |
| Z-Stress Max. - Min. Difference | 100 | 74 |

From the examples illustrated above one can expect this present invention tire to have significant improvements in tread life. The lower stresses and better stress distribution should result in less scrubbing of the tire contact patch on the ground surface. However, significant improvements in one area of performance should not be achieved at the expense of other performance parameters. A number of different size tires were tested for noise, comfort, handling, and traction. These results are shown in the table of comparative example 3. Also shown in this table, are the significant tread life improvements. Some improvements in noise, handling, and traction are noted with comfort remaining the same. In conclusion, tread life has been significantly improved over the prior art tire while other performance parameters are maintained at a relatively high level.

COMPARATIVE EXAMPLE 3

| Performance | Prior Art | Present Invention |
|---|---|---|
| Tread Life | | |
| High Severity | 100 | 150 |
| Low Severity | 100 | 120 |
| Irregular | Good | Good |
| UTQG treadwear rating | 330 | 480–520 |
| Noise | 6.3 | 6.5 |
| Comfort | 6.4 | 6.4 |
| Handling | 6.5 | 6.6 |
| Traction | | |
| Wet | 100 | 104 |
| Dry | 100 | 102 |

Figure 1:
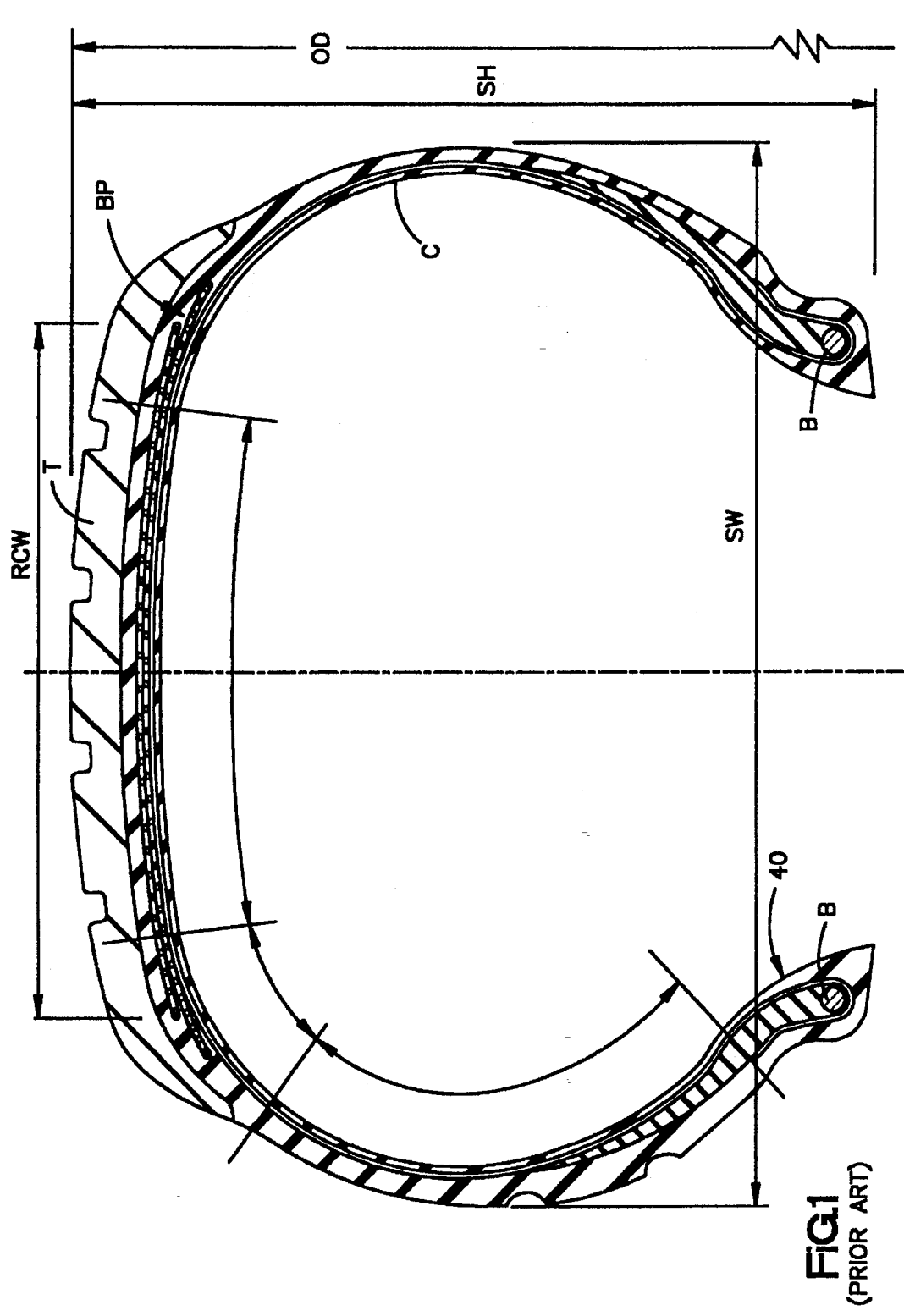
FIG. 1 is a cross-sectional view of a prior art tire.
Figure 7:
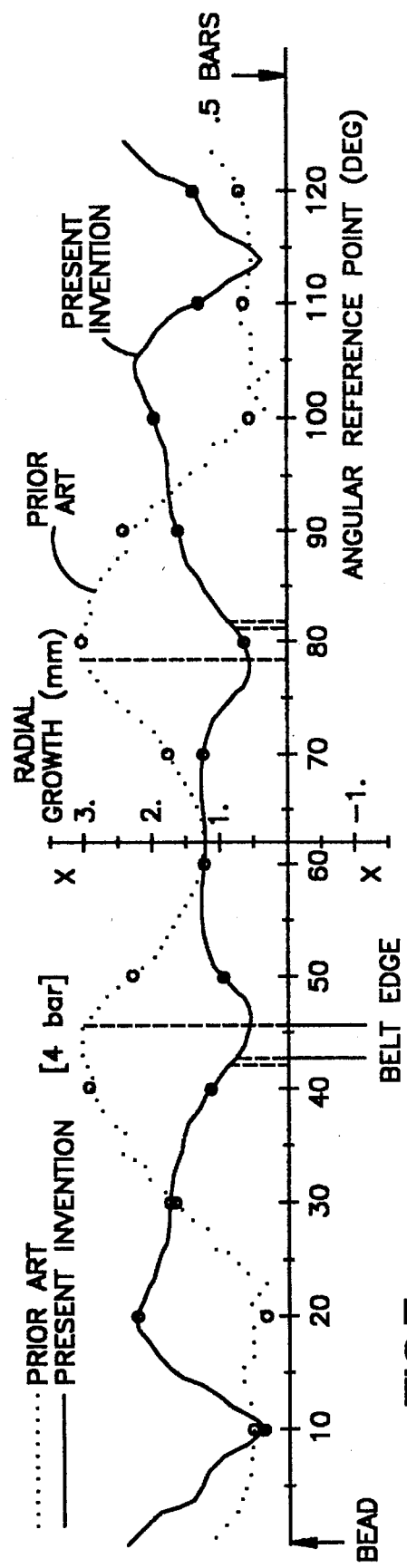
FIG. 7 is a graph of the radial growths of a prior art tire and the tire embodying the present invention which occurs during inflation.
Figure 2:
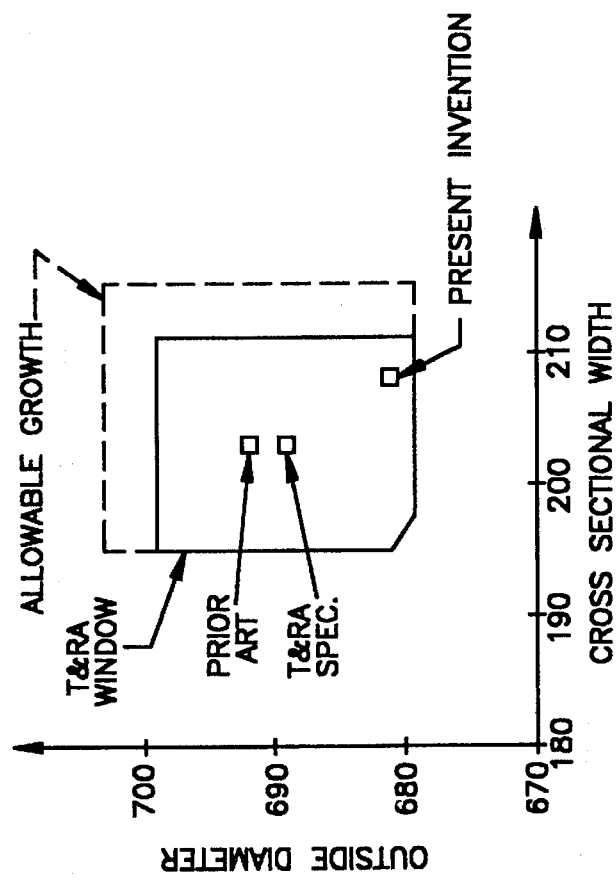
FIG. 2 shows the relationship between the outside diameter and the cross sectional width of a typical industry standard tire.

A typical plot of the radial growth under inflation from 0.5 bars to 4.0 bars of the present invention tire shows a considerable change (FIG. 7). This growth is measured from an internal point G located a fixed distance from the rim to the tire innerliner 64 for each 13, 14 and 15 inch tire (FIG. 3). The maximum growth has been moved from the shoulder are in the prior art tire to the sidewall area in the present invention.

While the present invention has been disclosed with the preferred embodiments and best mode defined, it should be understood that there may be other embodiments which fall within the scope and spirit of the invention as defined.

Having described a preferred embodiment of the invention, what is claimed is:

1. A radial pneumatic tire rotatable about an axis of rotation, said tire comprising:

a pair axially spaced apart beads;

a carcass extending between and secured at opposite end portions to said beads, said carcass including a plurality of parallel extending reinforcing members with each of said carcass reinforcing members disposed radially, and having a carcass radius when the tire is properly inflated defined as the perpendicular distance from an axis of rotation to a center point being the intersection of the carcass reinforcing member and a mid-circumferential plane of the tire in a radial plane;

a tread located radially outward of a crown portion of said carcass, said tread having a radially outward tread surface for engagement with a ground surface;

a belt package disposed between said carcass and said tread; and means for receiving a rim to locate said beads, whereas said carcass has a profile when the tire is properly inflated, taken in the radial plane extending radially from the axis of rotation, comprising:

a) a center portion of said profile having a first radius of curvature with an origin in the mid-circumferential plane at a location radially inward from the center point, said first radius of curvature being at least three times the carcass radius and extending to an end point of said profile created by rotating the first radius of curvature two degrees in the radial plane to a side of the mid-circumferential plane;

b) a first point of said profile located in the radial plane at the intersection of a line parallel to and spaced axially from the mid-circumferential plane a distance in the range of 25 percent to 32 percent of the carcass radius and a line parallel to the axis of rotation and spaced radially inward from the center point a distance in a range of 3 percent to 5 percent of said carcass radius;

c) a second point of said profile between said first point and said end point in the radial plane, said second point located at the intersection of a line normal to a line connecting said first point and said end point at a location 65 percent of the distance from said first point toward said end point and a line parallel to the axis of rotation and spaced radially inward from the center point a distance in a range of 1.6 millimeters to 3.2 millimeters;

d) a second portion of said profile having a second radius of curvature, with an origin point in the radial plane, defining that portion extending between said first point and said second point, said second radius of curvature having a magnitude in a range of 17 percent to 30 percent of said carcass radius;

e) a blend portion of said profile having a third radius of curvature, with an origin in the radial plane, defining that portion extending between said second point and said end point, said third radius of curvature having a length defined by a linear distance from the second point through the origin point to an intersection point with the line from the end point to the origin of the first radius of curvature, said origin of the third radius of curvature being at the intersection point and said blend portion providing a continuous curvilinear profile at the end point and the second point, said third radius of curvature having a magnitude in a range of about 13 percent to about 145 percent of the carcass radius; and f) a sidewall portion of said profile having a fourth radius of curvature and extending from the first point to a rim transition point in the radial plane being axially outward of the mid-circumferential plane, whereas a ratio being the fourth radius of curvature times a radial distance to each sidewall point from the axis of rotation divided by a radial distance to the first point from the axis of rotation is in a range of 30 millimeters to 64 millimeters, said sidewall portion providing a continuous curvilinear profile at the first point and the rim transition point.

2. The tire set forth in claim 1 wherein said tire during inflation from an essentially uninflated condition to a predetermined proper inflation pressure is further characterized by:

a first radial growth of the carcass at the mid-circumferential plane of about 0.3 millimeters to about 0.5 millimeters;

a second radial growth of the carcass at each lateral edge of the belt package being less than said first radial growth; and a third growth of the carcass sidewall portion in a direction transverse to the mid-circumferential plane having a value greater than said first radial growth.

3. The tire set forth in claim 1 wherein said tire is further characterized by:

a first belt of said belt package located radially outward of said carcass having a plurality of substantially parallel extending reinforcing members and having a width relative to a rolling tread contact width of said tread surface in a range of about 107 percent to about 116 percent; and a second belt of said belt package located radially outward of the first belt having a plurality of substantially parallel extending reinforcing members and a second width approximately 100 percent to 108 percent of the rolling tread contact width of said tread surface.

4. The tire set forth in claim 3 wherein said tire is further characterized by a radial droop distance of each lateral edge of said second belt of said belt package having a value from 6 millimeters to 10 millimeters.

5. The tire set forth in claim 1, wherein the second radius of curvature is in a range of 17 percent to 30 percent of the carcass radius.

6. The pneumatic tire set forth in claim 1, wherein the ratio is in a range of 38 to 50 millimeters.

7. The tire set forth in claim 1, wherein said reinforcing members are made of a polyester material.

* * * * *